United States Patent
Sutherland et al.

(10) Patent No.: US 11,269,566 B2
(45) Date of Patent: Mar. 8, 2022

(54) USER INTERFACE FOR DEPLETION LEVEL SELECTION

(71) Applicant: HEWLETT-PACKARD DEVELOPMENT COMPANY, L.P., Spring, TX (US)

(72) Inventors: Jesse Otto Sutherland, Houston, TX (US); Wesley R Schalk, Houston, TX (US); Kris M English, Houston, TX (US); Morgan T Schramm, Houston, TX (US); Howard G Wong, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/609,463

(22) PCT Filed: May 15, 2018

(86) PCT No.: PCT/US2018/032773
§ 371 (c)(1),
(2) Date: Oct. 30, 2019

(87) PCT Pub. No.: WO2019/221709
PCT Pub. Date: Nov. 21, 2019

(65) Prior Publication Data
US 2021/0365218 A1    Nov. 25, 2021

(51) Int. Cl.
*G06F 3/12* (2006.01)
*H04N 1/34* (2006.01)
*G06F 3/04842* (2022.01)
*G06F 3/04817* (2022.01)
*G06F 3/04855* (2022.01)

(52) U.S. Cl.
CPC ........ *G06F 3/1208* (2013.01); *G06F 3/04817* (2013.01); *G06F 3/04842* (2013.01); *G06F 3/04855* (2013.01); *G06F 3/1219* (2013.01); *G06F 3/1258* (2013.01); *H04N 1/346* (2013.01)

(58) Field of Classification Search
None
See application file for complete search history.

(56) References Cited

U.S. PATENT DOCUMENTS

| | | | |
|---|---|---|---|
| 6,145,950 A | 11/2000 | Ohtsuka et al. | |
| 7,525,684 B2 | 4/2009 | Majewicz | |
| 7,826,760 B2 * | 11/2010 | Willis | G03G 15/553 399/81 |
| 8,009,177 B2 | 8/2011 | Kawano et al. | |
| 8,687,238 B2 | 4/2014 | Gondek et al. | |
| 8,851,594 B2 | 10/2014 | Puigardeu et al. | |

(Continued)

FOREIGN PATENT DOCUMENTS

KR    20080035310 A    4/2008

*Primary Examiner* — Miya J Williams
(74) *Attorney, Agent, or Firm* — Austin Rapp

(57) ABSTRACT

Examples of a user interface (UI) for depletion level selection are described herein. In some examples, a control element is displayed in a UI to select a color depletion level for a color printing substance of a printing device. A predicted cost-per-page to print is displayed in the UI based on based on a selected color depletion level. A color map for the printing device is determined based on the selected color depletion level and a separate black depletion level.

15 Claims, 9 Drawing Sheets

(56) References Cited

U.S. PATENT DOCUMENTS

| | | |
|---|---|---|
| 8,854,689 B2 | 10/2014 | Faber et al. |
| 9,734,570 B2 | 8/2017 | Honeck et al. |
| 2002/0075501 A1* | 6/2002 | Mantell ............... H04N 1/6005 358/1.14 |
| 2005/0063749 A1 | 3/2005 | Harris et al. |
| 2005/0105136 A1 | 5/2005 | Jung |
| 2009/0010536 A1* | 1/2009 | Mizukami .............. H04N 1/603 382/167 |
| 2010/0005038 A1 | 1/2010 | Nagarajan et al. |
| 2011/0032551 A1 | 2/2011 | Faber et al. |
| 2011/0051156 A1 | 3/2011 | Yorimoto et al. |
| 2013/0265599 A1* | 10/2013 | Faber ................ G03G 15/5075 358/1.9 |
| 2013/0335756 A1* | 12/2013 | Bhaskaran ........... H04N 1/6011 358/1.9 |
| 2014/0210892 A1 | 7/2014 | Maruyama |
| 2017/0253063 A1 | 9/2017 | Schuppan |
| 2021/0337083 A1* | 10/2021 | Schramm ............. H04N 1/6008 |

\* cited by examiner

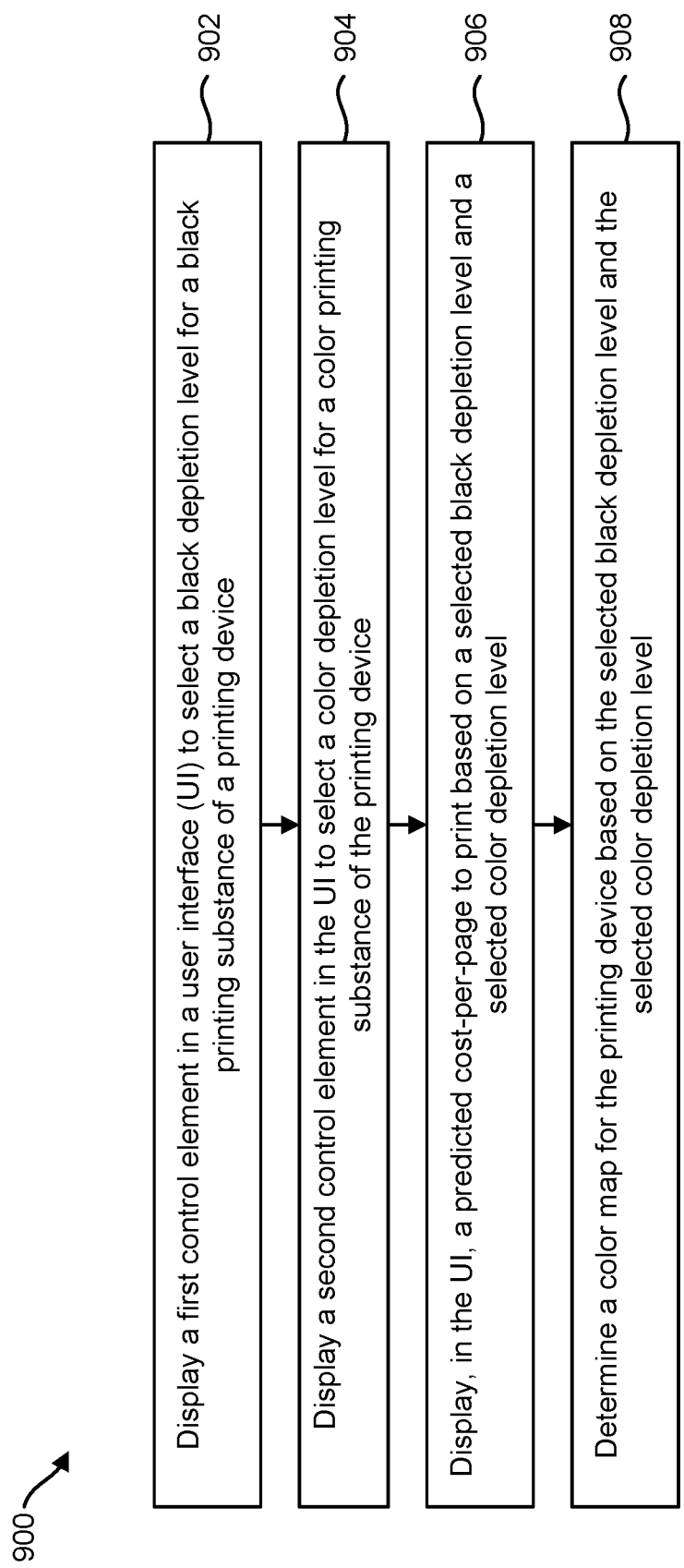

УСЕР INTERFACE FOR DEPLETION LEVEL
USER INTERFACE FOR DEPLETION LEVEL SELECTION

BACKGROUND

Printing devices may apply a print substance, which can include printing agents or colorants, to a substrate such as paper. A printing device may include a black print substance and color print substances. In some examples, a printing device may reduce an amount of a black or color print substance used to print by a depletion level.

BRIEF DESCRIPTION OF THE DRAWINGS

FIG. 9 is a flow diagram illustrating another method for depletion level selection.

DETAILED DESCRIPTION

Figure 1:
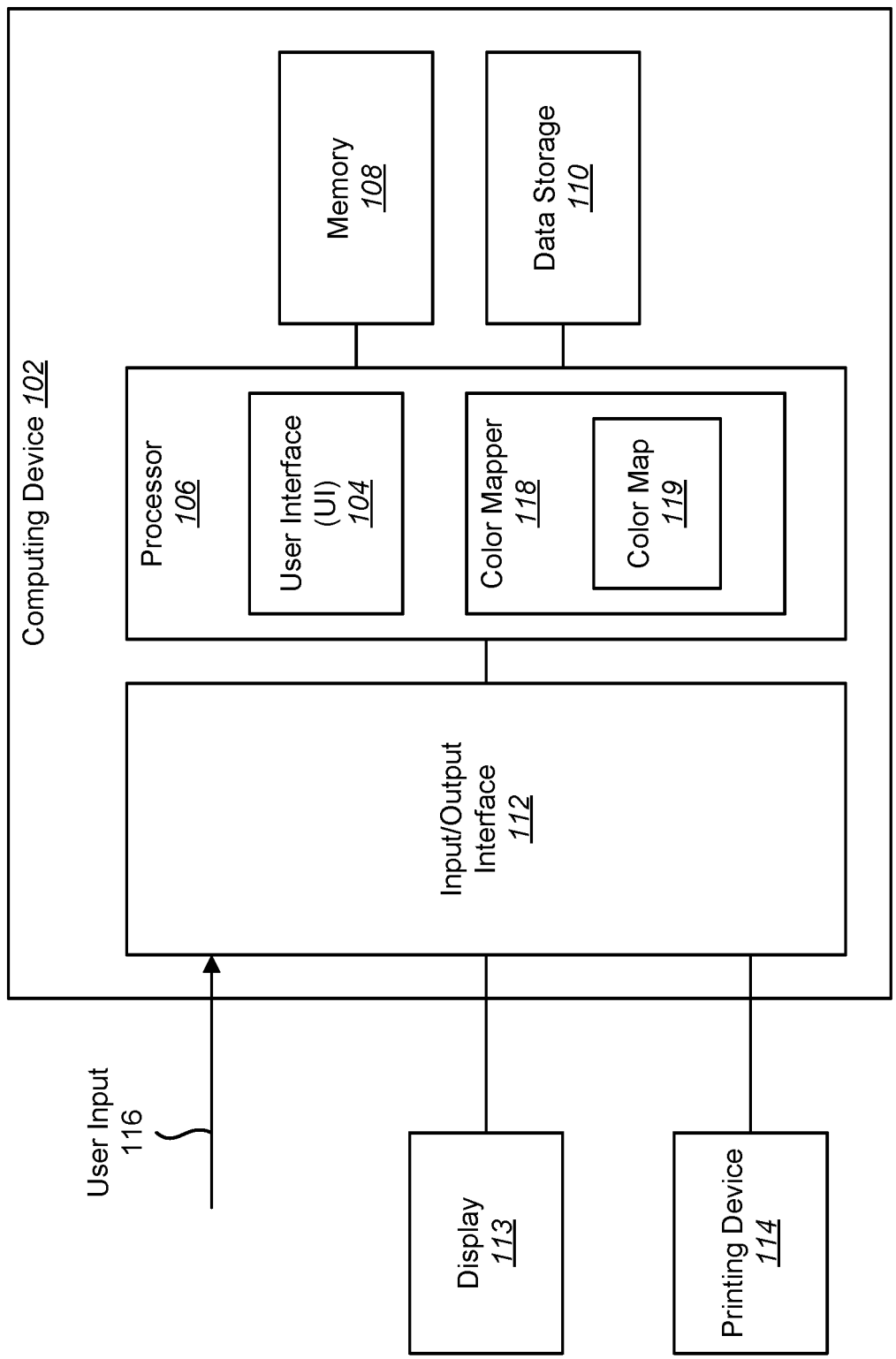
FIG. 1 is a simplified block diagram of a computing device incorporating a user interface (UI) for depletion level selection.

Printing devices—including printers, copiers, fax machines, multifunction devices including additional scanning, copying, and finishing functions, all-in-one devices, pad printers to print images on three dimensional objects, and three-dimensional printers (additive manufacturing devices)—employ color management systems including color management resources to deliver a controlled conversion between color representations of various devices, such as image scanners, digital cameras, computer monitors, printers, and software applications including browsers and photo and design programs. In general, printing devices apply a print substance, which can include printing agents or colorants, to a substrate. A substrate is a superset of print media, such as plain paper, and can include any suitable object or materials to which a print substance from a printing device are applied including materials, such as powdered build materials, for forming three-dimensional articles. Print substances, including printing agents and colorants, are a superset of inks and can include toner, liquid inks, or other suitable marking material that may or may not be mixed with fusing agents, detailing agents, or other materials and can be applied to the substrate.

Printing devices often employ color tables to provide transformations between input color spaces and subtractive color spaces to determine corresponding formulations of print substance amounts, such as print substance volumes, to render the intended colors. In one example, printing devices often employ color tables including multidimensional color look-up tables to provide transformations between different color spaces such as from input device-independent colors to cyan-magenta-yellow-key (black) (CMYK) print substance amounts in the case of two-dimensional printing devices for printing on media or, in the case of three-dimensional printing devices, printing agent amounts for printing on a powder or other material.

Many colors of a color space (e.g., CMYK, RGB, HSV, HIS, etc.) can be rendered from a set of colors or a combination of color and black. For example, colors in the gamut of a CMYK color space for printing devices can be rendered from just the set of process colors of cyan, magenta, and yellow and, in some color resource models, do not include a black channel. In many printing devices and printing modes, however, an achromatic black channel can be added to some of colors in the CMYK color space to reduce process color print substance consumption for some darker colors, stabilize neutral color such as in the grey tones, and to improve printability of blacks.

For devices such as color printers or other printing devices, color resources including the color tables can be embedded in memory devices storing the printer firmware or other hardware. In some examples, the particular color transform of the color resource may be colorant-dependent, such as dependent on the particular formulation of each of the print substance included in a supply component such as a cartridge, and information regarding the color gamut characterization in the color resource can be stored on a memory device located on the cartridge for use with the printing device such as its firmware or other hardware.

Typically, color printing agents or colorants (e.g., cyan, magenta, and yellow) are significantly more expensive than similar amounts of black printing agents or colorants. Depending on the application or the industry, the disparity can lead to a substantially greater expense for color printing in color versus black and white printing. Some users may attempt to address this additional expense by generally printing documents in greyscale, or black and white mode, while selectively printing documents in full color mode or by printing all documents in black and white mode. Often, black and white mode versions of color documents lack significant information or distinctions that users may find valuable. Other users may attempt to address the additional expense by printing color documents in a depleted color mode with depleted colors that compromises print quality.

In a typical example of a depleted color mode, the amount of the color printing agent or colorant is uniformly scaled back from an amount used in full color mode to produce a washed out depiction of the source document. As many colors do not include a black component in the color space, such as pastels, such colors become depleted to almost white. While uniform color depletion outputs may convey more information than black and white mode and save on expense over a full color mode, such color depletion outputs typically include poor image quality that many users find unappealing at meaningful reductions in printing agent expense.

In response to the added expense of printing in a full color mode and the poor image quality of printing in black and white mode or a uniform depleted color mode, a color map for a printing device may be determined by interpolating from existing color maps using selected depletion levels. One such approach includes grey component replacement, or GCR, which replaces a selected amount of color (e.g., CMY) printing agents or colorants with black printing agents or colorants for many colors. GCR renders many colors with a combination of black and a subset of colors in a color space. For example, two of three CMY printing agents or colorants may be used instead of three colors of the CMY printing agents or colorants. GCR can provide significantly better image quality than uniform color depletion and black and white outputs, while saving in costs over full color printing.

In a depleted color space, a luminous intensity may be maintained for colors in a depletion mode by determining a luminous intensity for source colors converted into a corresponding greyscale color space. A black channel amount may be adjusted along with depletion colors to correspond to a luminous intensity that matches that of the greyscale color space. In this manner, the black channel may be optimized to maintain luminous intensity of a depletion color space.

In some examples, a source color may be mapped from a first color space to a target color in a second color space (e.g., depletion color space) and stored on a memory device for use with a printing device. The first color space may be different than the depletion color space, and, in one example, the depletion color space may be a device dependent color space and can include a subtractive color space of a printing device. For instance, the printing device may employ a CMYK color space corresponding with process colors of cyan, magenta, and yellow printing agents or colorants and a black printing agent or colorant.

A source color may be converted from the first color space to a corresponding greyscale color in a greyscale color space at 102. The greyscale color includes a luminosity amount corresponding with a luminous intensity of the greyscale color, or first luminosity amount, which is determined or measured. In one example of converting the source color to a corresponding greyscale color, the source color is converted to a corresponding greyscale color. For some examples of a first color space, such as the additive color space sRGB (which was standardized by the International Electrotechnical Commission as IEC 61966-2-1:1999), the first luminosity amount can be determined directly from the source color via a mathematical translation of the source color to greyscale. Luminosity amount is related to the luminous intensity of the greyscale color and not to a particular formulation or technique to determine luminous intensity.

The target color in the depletion color space may be generated from a color depletion level. The target color in the depletion color space represents the source color in the first color space in the color resource. The depletion color in the depletion color space corresponds with a transformation of the source color in the first color space. In one example, the depletion color can correspond with an intermediate transformation of the source color. For instance, the depletion color includes a selected process-color formulation of the source color. In the example of the depletion color space as a subtractive or CMYK color space, the depletion color is formulated from one, two, or three colors selected from the process colors of cyan, magenta, and yellow, and includes amounts in a cyan channel, magenta channel, and yellow channel. As used in this disclosure, a process color component is of the set of cyan, magenta, and yellow, and can include a zero amount of cyan, magenta, or yellow, but does not include the black component. In one illustration, the depletion color includes a black channel amount of zero.

The depletion color, in one example range, can include an amount of print substance for the process colors (cyan, magenta, and yellow), used to produce a full color version of the source color in the depletion color space. In one example, amounts are determined by volume of print substance. Accordingly, a depletion color from the process colors may include a luminosity amount that is less than the first luminosity amount of the greyscale color at 102.

An amount in the black channel, for the depletion color space, may be provided to the depletion color and adjusted to generate the target color such that the luminosity amount of the target color, or second luminosity amount, matches the first luminosity amount of the greyscale color. One example of matching the first luminosity amount to the second luminosity amount includes providing a second luminosity amount that is identical to the first luminosity amount. Another example of matching the first luminosity amount to the second luminosity amount includes providing a second luminosity amount that is generally the same as the first luminosity amount such as a second luminosity amount that is within a few percent of the first luminosity amount. In this example of matching the first luminosity amount to the second luminosity amount includes providing a second luminosity amount visually generally imperceptible to the naked eye of first luminosity amount.

Furthermore, users (e.g., dealers, administrators, print service providers or end-users) currently can select text and image quality by print mode and can make adjustments to colors for color matching. However, users cannot adjust the depletion ratios of black and color to optimize the page attributes with respect to cost for their specific usage and environments.

The disclosure describes a user interface (UI) that provides a user (e.g., a dealer and/or customer) to individually choose and lock-in the depletion level for black and/or color. The black depletion level is associated with black print substance (e.g., ink) usage and the color depletion level is associated with color print substance usage. In one example, a first slider may be used to select the black depletion level and a second slider may be used to select the color (e.g., CMY) depletion level. Various criteria (e.g., cost-per-page, page yield, date-to-supply-exhaustion) may be reflected in the UI based on changes to the depletion levels. A color map associated with the selected depletion levels may be determined by interpolating between existing color maps.

Additionally, a user may be presented with instant feedback via a virtual preview of the results changes to depletion levels or the ability to print a sample with the ability to see before and after states and zoom in for additional details. The ability to see the results of the changes to depletion levels may be at the device (e.g., locally) or may be remotely displayed via an embedded web server (EWS), fleet monitoring tool, or mobile app.

FIG. 1 is a simplified block diagram of a computing device 102 incorporating a user interface (UI) 104 for depletion level selection. In some examples, the computing device 102 may be a computer (e.g., desktop computer, laptop computer, server, etc.) or the computing device 102 may be integrated with a printing device 114.

The computing device 102 includes a processor 106. The processor 106 may be any of a central processing unit (CPU), a microcontroller unit (MCU), a semiconductor-based microprocessor, GPU, FPGA, an application-specific integrated circuit (ASIC), and/or other hardware devices suitable for retrieval and execution of instructions stored in the memory 108. The processor 106 may fetch, decode, and execute instructions, stored on the memory 108 and/or data storage 110, to implement the UI 104 for depletion level selection.

The memory 108 may include read only memory (ROM) and/or random access memory (RAM). The memory 108 and the data storage 110 may also be referred to as a machine-readable storage medium. A machine-readable storage medium may be any electronic, magnetic, optical, or other physical storage device that contains or stores executable instructions. Thus, the machine-readable storage medium may be, for example, RAM, EEPROM, a storage device, an optical disc, and the like. In some examples, the machine-readable storage medium may be a non-transitory machine-readable storage medium, where the term "non-transitory" does not encompass transitory propagating signals. The machine-readable storage medium may be encoded with instructions that are executable by the processor 106.

The computing device 102 includes an input/output interface 112 coupled to processor 106 (via a data and address bus, for example) to promote data communications between the computing device 102 and external data processing and conditioning devices, including a display 113 and a printing device 114. User input 116 may be received at the input/output interface 112 from input devices (not shown). The input devices may include keyboards, cursor manipulating tactile input devices (e.g., mouse or touchpad), voice recognition systems, joysticks, remote controls, graphics tablets, touchscreens, data readers, card readers, magnetic and optical readers, other computer systems (e.g., networked computing devices), etc.

The user receives visual feedback via the display 113. According to one construction, the display 113 may include a graphics display terminal, such as a liquid crystal display.

In some examples, the display 113 may be an external device coupled to the computing device 102. For example, the display 113 may be a monitor attached to the computing device 102. In other examples, the display 113 may be a remote display (e.g., a laptop display or mobile device display) in communication with the computing device 102.

In yet other examples, the display 113 may be included as part of the computing device 102. In other words, the display 113 may be a local display. For example, the display 113 may be a printer display on the printing device 114 where the computing device 102 is integrated with the printing device 114.

The user may enter commands and/or text into the UI 104 via the input/output interface 112. The user observes feedback from the computing device 102 using the display 113. The processor 106 operates on data using modules composed of lines of code that typically is stored in memory 108, in response to the commands from the user, and provides results that may be stored in the data storage 110, displayed on the display 113 or that may be communicated to other devices external to the computing device 102, such as the printing device 114. It will be understood that while a single computing device 102 and printing device 114 are described for clarity of explanation and ease of understanding, it may also be practiced in systems that include multiple computers (e.g., servers) and multiple printing devices 114 and the like.

The computing device 102 may include additional components (not shown). In addition, components disclosed herein may be internal to the computing device 102. For instance, the display 113 and/or printing device 114 may be included as part of the computing device 102.

Users (e.g., printer dealers or end-users) often want a printout that has color properties that are different than the pre-set print modes offered on the printing device 114 or printer drivers. However, users do not have a way to customize the color properties aside from very coarse print mode settings. For example, dealers or end-users can select text and image quality by print mode and can make adjustments for color matching. However, they cannot adjust the depletion ratios of black vs. color to optimize the page attributes that help convey information with regard to cost for their specific usage and environments.

Examples of visual page attributes may include the following: color properties such as chroma (e.g., colorfulness relative to the brightness); maintaining hue differentiation; color accuracy; optical density; color saturation; and contrast.

Depletion may reduce mottle print defects. As used herein, mottle is non-uniform fills over large area fills. For example, mottle may be the ink highlight peak and troughs on page contour.

Depletion may reduce ink coalescence print defects. As used herein, coalescence is a print defect where ink puddles on the surface of the media.

Depletion may reduce bleed print defects. For example, less ink means less capillary action where the media fibers wick ink away from its printed location.

Depletion may reduce strike through on duplex jobs. As used herein, strike through is visibility of the printed image on second side of the page while viewing first side.

Depletion may also impact physical page attributes. These physical page attributes may include flatter sheets (e.g., less ink means less damage to the media during the printing process resulting in less curl or cockle and improved media handling reliability); warmer printed media temperature (e.g., when ink dries it cools the page, where less ink means sheets will come out of the printing device 114 feeling closer to room temperature); dryer printed media (e.g., less ink means less likelihood of transferring moisture from the ink to other pages or folders); lower smear likelihood (e.g., less ink means lower likelihood of smearing the image on the page or smearing when the image is touched/smudged or highlighted with a highlighter pen); less ink tracking on rollers, shafts or output bin, which enables faster print speed; less ink improves media handling reliability; less ink improves finishing performance and reliability (e.g., stapling, booklet making, hole punching, binding, laminating, folding, etc.).

Additionally, printing service providers for printing devices 114 may want to customize their service offering for specific customers, environments, document types and customer affordability. For example, one customer may have different printing needs than another customer. Therefore, the printing service provider may wish to tailor the print quality to meet the needs of the various customers.

In current approaches, users may choose among pre-set print modes (e.g., professional color, general office mode, etc.). However, with these approaches, the user does not have the ability to customize the amount of print substance (e.g., ink) used for monochrome (i.e., mono) and/or color printing independently to values they choose. As used herein, depletion level refers to an amount that a print substance (e.g., ink) is reduced from a full-monochrome or full-color version.

The UI 104 described herein provides the ability for a user (e.g., dealer, print service provider, administrator, end-user) to individually choose and save the depletion levels for black and color. In some examples, the UI 104 may be implemented on the printing device 114, in an embedded webserver (e.g., at a computer at the printer site), or as a remote service (e.g., at a remote computer). The UI 104 may be a graphical user interface that is implemented by the processor 106 and displayed on the display 113.

It should be noted that the UI 104 may be displayed locally (e.g., at a display of a printing device 114) and/or remotely (e.g., via an embedded web server (EWS), fleet monitoring tool, or mobile app).

Figure 2:
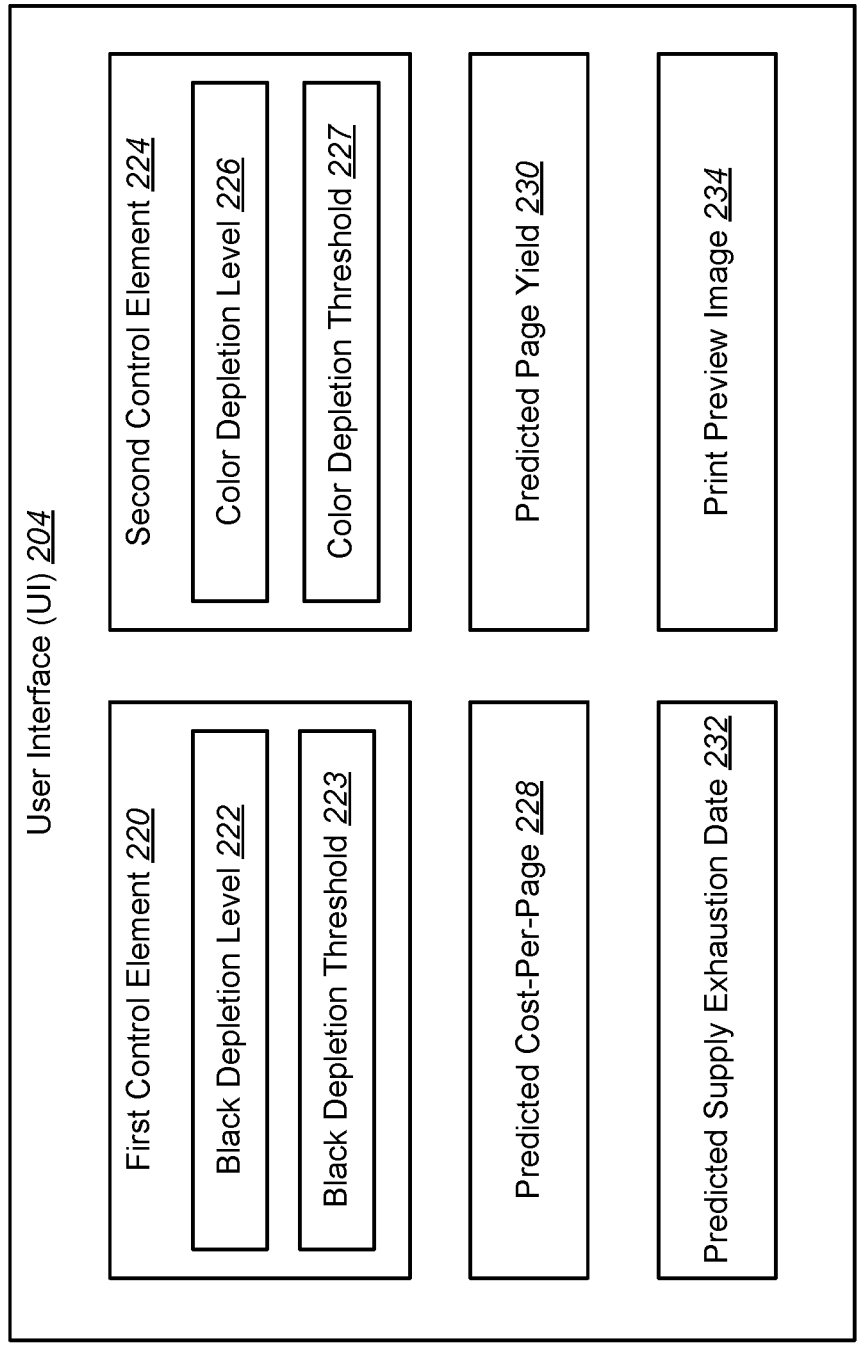
FIG. 2 is a simplified block diagram of a UI for depletion level selection.

Referring now to FIG. 2, the UI 204 includes control elements that may be used to configure the black depletion level 222 and the color depletion level 226 independently. For example, the UI 204 may include a first control element 220 to select a black depletion level 222 for a black print substance (e.g., black ink) of the printing device 114. It should be noted that in one implementation, the black depletion level 222 may be optimized and/or not otherwise user-selectable.

The black depletion level 222 may be an amount that the black print substance is reduced as compared to the amount of black print substance used in a full-monochrome or full-color version. The black depletion level 222 may be a percentage reduction in the amount of black print substance used to print. For example a black depletion level 222 of 0% would be no reduction in the amount of black print substance used to print, while a black depletion level 222 of 60% would represent a 60% reduction in the amount of black print substance used to print. The black depletion level 222 for the black channel may be optimized to maintain luminous intensity of depleted colors, as described above.

The UI 204 may also include a second control element 224 to select a color depletion level 226 for color print substances. The color depletion level 226 may be an amount that the color print substance(s) is/are reduced as compared to a full-color version. The color depletion level 226 may also be a percentage reduction in the amount of color print substance used to print. For example a color depletion level 226 of 0% would be no reduction in the amount of color print substance(s) used to print, while a color depletion level 226 of 100% would represent a 100% reduction in the amount of color print substance(s) used to print. In another example, a color depletion level 226 of 90% would represent an average of 90% reduction in the amount of color print substance(s) used to print but each color may be reduced more or less than 90%.

The control elements 220, 224 may be implemented as any method of adjustment that interfaces with the UI 204. In some examples, the control elements 220, 224 may be a virtual adjustment control in a graphical user interface. Examples of virtual adjustment controllers (also referred to as a control or widget) include sliders, knobs, buttons (e.g., up/down button), radio buttons, check boxes, list boxes, drop-down list, menu, text box, etc. In some examples, the control elements 220, 224 may be physical adjustment controls that communicate with the UI 204 to provide a user the ability to select the black depletion level 222 and/or a color depletion level 226. Examples of physical control elements 220, 224 include knobs, switches, keyboards, keypads, touchscreens, etc. in communication with the user interface 204 (via an input/output interface, for instance).

In an example, the control elements 220, 224 may be sliders. A first slider may be used to select the black depletion level 222. A second slider may be used to select the color depletion level 226 for multiple colors. In this case, the color depletion level 226 of multiple colors (e.g., CMY) may be combined (e.g., ganged) into a single slider. An example of this UI approach is described in FIG. 3.

In another example, a first slider may be used to select the black depletion level 222, but multiple sliders may be used to individually select color depletion levels 226 for multiple colors. For example, one slider may be used to select the cyan (C) depletion value (i.e., the amount to reduce the cyan print substance). Another slider may be used to select the magenta (M) depletion value (i.e., the amount to reduce the magenta print substance). Yet another slider may be used to select the yellow (Y) depletion value (i.e., the amount to reduce the yellow print substance). An example of this UI approach is described in FIG. 4.

The UI 204 may display a print preview image 234 that reflects the selected black depletion level 222 or the selected color depletion level 226 in real time. The print preview image 234 may be of virtual content or current job content. Virtual content may be a preconfigured representative image. For current job content in the print preview image 234, the UI 204 may include an "Open File" button to load content. Additionally, the UI 204 may display a left arrow button and a right arrow button to advance through the content (e.g., a slide deck of a presentation program). It should be noted that other control elements (e.g., slider, text box, etc.) may be used to advance through content in the UI 204.

The print preview image 234 may depict an image of a document. As the sliders are moved, the print preview image may reflect the changes to the document as the black depletion level 222 and/or color depletion level 226 change. In this manner, a user may visually assess the quality of the print as the changes in the depletion levels 222, 226 are made. The print preview image 234 may provide a user with instant feedback of changes to the depletion levels 222, 226. In some examples, the user may zoom in on the print preview image 234 to see additional details.

It should be noted that the control elements 220, 224 may be implemented as other types of user-interactive controls that allow the user to select the black depletion level 222 and/or color depletion level 226. For example, the control elements 220, 224 may be implemented as a text box in which a user enters a depletion level. Alternatively, the control elements 220, 224 may be drop-down selections from which the user selects the black depletion level 222 and/or color depletion level 226. Other types of user-interactive controls for the control elements 220, 224 may include radio buttons, up/down arrow buttons, etc.

In another example, the UI 204 may include selectable image thumbnails showing different sample images corresponding to different black and color depletion levels. The image thumbnails may be print preview images 234 that depict different black and color depletion levels 222, 226. In this approach, the selectable image thumbnails may be arranged in a grid (or array) of rows and columns. A first axis of the grid (e.g., the columns of the grid) may correspond to the black depletion level 222 and the second axis (e.g., the rows of the grid) may correspond to the color depletion level(s) 226. An example of this UI approach is described in FIG. 5.

In some examples, colors may be excluded from changes in depletion values. For example, a user may want a certain color to remain unchanged during depletion. The excluded color may be selected (e.g., by means of scanning, Pantone value, RGB value, CMYK value, etc.). Then, the excluded color may be isolated from depletion. In other words, as the user changes the black and color depletion levels 222, 226, the excluded color may be caged off from the depletion process and may remain unchanged. This approach may be beneficial to maintain the appearance of certain imagery (e.g., logos, trademarks, etc.) in a printed document.

The UI 204 may also display a predicted cost-per-page 228 to print based on the selected black depletion level 222 and the selected color depletion level 226. For example, a monetary cost for printing each page using the selected depletion levels may be displayed in the UI 204. The cost prediction may be calculated in a number of ways. For example, the cost prediction may be a function of the current job ink content, based on historical average ink content per page or based on a standard ISO suite. The cost prediction may also take into account the size of media (e.g., paper) used such as A3 or A4.

The predicted cost-per-page 228 may also reflect non-ink expenses. For example, as the depletion levels change, the predicted cost of consumables (e.g., wiper kit, rollers, etc.) in the printing device may be determined and reflected in the predicted cost-per-page 228. Also, maintenance and operational costs (e.g., service costs) may be reflected in the predicted cost-per-page 228 that is displayed in the UI 204. Thus, a user may optimize the print quality in terms of printing costs to suit their needs.

In some examples, the various cost parameters may be manually entered into the UI 204. For instance, the UI 204 may provide text fields or other control elements to enter values for ink and non-ink costs. Examples of these costs may include cartridge costs (e.g., black cartridge cost, color cartridge costs), non-ink consumable costs, operating costs, maintenance costs, etc. The UI 204 may determine a predicted cost-per-page 228 based on the manually entered costs and the selected black depletion level 222 and the selected color depletion level 226.

The UI 204 may also display a predicted page yield 230 based on the selected black depletion level 222 and the selected color depletion level 226. For example, the predicted page yield 230 may reflect an estimated number of pages that can be printed with the print substance (e.g., ink) that would be used with the selected depletion levels 222, 226.

In some examples, the UI 204 may provide for manually entering information that is used to determine the predicted page yield 230. For example, an estimated number of pages at full color/full black may be manually entered into the UI 204. The UI 204 may determine the predicted page yield 230 by adjusting the estimated number of pages at full color/full black according to the selected black depletion level 222 and the selected color depletion level 226.

In other examples, the UI 204 may determine the predicted page yield 230 automatically. For example, the UI 204 may automatically determine the remaining ink content of the printing device and may adjust the predicted page yield 230 using the selected black depletion level 222 and the selected color depletion level 226.

The predicted page yield 230 may be used in combination with the selected depletion levels 222, 226 to guarantee job completion. For example, if a certain job comprises 2000 pages, the depletion levels 222, 226 may be adjusted to optimize the print quality while ensuring that sufficient ink remains to finish the print job.

The UI 204 may also display a predicted supply exhaustion date 232 based on the selected black depletion level 222 and the selected color depletion level 226. For example, a date may be estimated for when printing device supplies (e.g., cartridge, ink, toner, etc.) will be exhausted using the selected black depletion level 222 and the selected color depletion level 226. As the depletion levels 222, 226 are increased, the predicted supply exhaustion date 232 is extended, thus extending the servicing date at the expense of print quality.

In some examples, the UI 204 may provide for manually entering information that is used to determine the predicted supply exhaustion date 232. For example, the supply refill date may be manually entered into the UI 204. The UI 204 may determine the predicted supply exhaustion date 232 by adjusting the supply refill date according to the selected black depletion level 222 and the selected color depletion level 226. In another example, the supply refill date may be scheduled via a calendar.

In other examples, the UI 204 may determine the predicted page yield 230 automatically. For example, the UI 204 may automatically determine the remaining ink content of the printing device and may adjust the predicted page yield 230 using the selected black depletion level 222 and the selected color depletion level 226.

Optimization based on predicted supply exhaustion date 232 may be beneficial for a supplier to remotely adjust the depletion levels 222, 226 of a printing device 114 to accommodate service schedules. For example, if new printing supplies cannot be delivered until a certain date, the supplier may adjust the depletion levels 222, 226 to ensure that an end-user will be able to print until the next servicing date.

In an example, the predicted cost-per-page 228, the predicted page yield 230 and the predicted supply exhaustion date 232 may be displayed in a single window of the UI 204. In another example, the UI 204 may include multiple tabbed windows each associated with the predicted cost-per-page 228, the predicted page yield 230 and the predicted supply exhaustion date 232.

In an example, the UI 204 may be displayed in a dealer's view in a service window of a managed service environment. For example, a dealer or service provider of printing devices 114 may access the UI 204 to make adjustments to the depletion levels 222, 226 to suit the needs to the end-user.

The print quality adjustments made in the UI 204 may be content aware. For example, changes to the depletion levels 222, 226 and resulting predicted cost-per-page 228, predicted page yield 230 and/or predicted supply exhaustion date 232 may be made in reference to a specific document. Therefore, the cost, yield and/or supply predictions may be more accurate than predictions that do not account for characteristics of a specific document.

In some examples, the black depletion level 222 and/or the color depletion level 226 may be capped by a certain amount. Black and color print substances may have a certain depletion amount at which visual information may be lost for a human observer. For example, black may have a limit of approximately a 60% black depletion level 222 before the black becomes too faded to accurately convey information to a human observer. Similarly, the human limit to discern color information may be approximately an 80%-90% color depletion level 226 before the color is unobservable. Therefore, the black depletion level 222 may be limited by a black depletion threshold 223 and the color depletion level 226 may be limited by a color depletion threshold 227. In an example, the black depletion threshold 223 may be 60% and the color depletion threshold 227 may be 80%-100%.

It should be noted that the color depletion threshold 227 may be higher than the black depletion threshold 223. A high color depletion level 226 (e.g., 80%-100%) may result in loss of color information, but the resulting image becomes monochrome. Thus, visual information with a high color depletion level 226 may be retained, albeit in monochrome.

Referring again to FIG. 1, the processor 106 may implement a color mapper 118 that determines a color map 119 for the printing device 114 based on the selected black depletion level and the selected color depletion level. A color profile is a formal set of data that characterizes the color gamut in a color space. In one example, a color profile can describe the color attributes of a particular device or viewing specifications with a mapping between the device-dependent color space, such as a source or target color space, and a device-independent color space, such as profile connection space (PCS), and vice versa. The color mappings may be specified using tables such as look up tables, to which interpolation is applied, or through a series of parameters for transformations. Devices and software programs—including printing devices, monitors, televisions, and operating systems—that capture or display color can include color profiles that comprise various combinations of hardware and programming.

The color map 119 may be determined to optimize the black channel of a depletion color space. For example, a luminous intensity for source colors may be converted into a corresponding greyscale color space. A black channel amount may be adjusted along with depletion colors to correspond to a luminous intensity that matches that of the greyscale color space.

In an example, as the slider(s) is/are moved (or different thumbnails are selected), the color mapper 118 may interpolate the color maps 119 from existing color maps based on the selected black depletion level 222 and the selected color depletion level 226. The existing color maps may be pre-configured color maps (e.g., general office and professional modes). Thus, a large number of black & color combinations may be created from the UI 104 using the existing color maps of a given printing device 114. This allows the user (e.g., dealer or end-user) to choose not just from a few pre-defined print modes but to optimize the output settings for their needs.

It should be noted that interpolating a color map 119 from existing color maps may result in superior print quality as compared to simply applying a uniform depletion based on the selected depletion levels. In other words, the color map 119 may not be a simple percentage reduction of print substance. Instead, by interpolating from existing color maps to determine the color map 119 associated with the selected black and color depletion levels, the color information of the original document may be maintained without becoming washed out, which occurs with uniform depletion.

In some examples, a sample image (or others) may be printed out via a print button on the UI 104 for the end-user's approval. Once the appropriate depletion levels are selected, the computing device 102 may store the selected black and color depletion levels. These stored depletion levels and associated color maps 119 may be used as defaults for printing or copying in that mode.

The UI 104 may control a single printing device 114, a group of printing devices 114, or a fleet of printing devices 114. For example, the UI 104 may allow a user to select which printers to configure. Changes to the depletion levels and color maps 119 may be associated with printing devices 114. For example, each printing device 114 of the same model in an organization may be configured with the printing mode modified in the UI 104.

The printing configuration via the UI 104 may occur at different times and in different contexts. For example, a dealer may use the UI 104 to perform an initial installation of printing devices 114. A service provider may access the UI 104 to remotely to adjust the depletion levels to accommodate service dates. An end-user may use the UI 104 on a job-to-job basis to optimize print quality and printing costs.

Once configured, the saved depletion levels may be linked with other services to provide a customized page for a specific user and or application. Additionally, this technique can also be extended to a network (e.g., Server Message Block (SMB) Protocol) or corporate environment not managed by a managed print service provider. Using the UI 104, a designated administrator can set the page quality and attributes vs. cost to reflect the needs for their organizations.

The UI 104 allows the printing device 114 to be easily configured without requiring deep technical knowledge. The UI 104 also speeds up the evaluation and sales process by displaying representative print preview image samples on the UI 104 that can also be printed out.

Furthermore, the UI 104 allows service providers to optimize the image quality and page attributes with respect to the price charged per page for each individual customer, site or contract. This customization may result in a superior service offering. The ability of the dealer to change the quality/cost of the page also allows them to position the product differently for each customer, which would allow the dealer to optimize their sales strategies.

The UI 104 may provide ink usage or yield information for a given document as well as a predicted cost-per-page as a function of the selected depletion levels. The use of the UI 104 is an easy way to select the depletion levels and can be configured for ease-of-use by the dealer, service provider and/or end-user.

The configuration of the page depletion levels may be done within the UI 104 and then locked in. This allows for a common experience for every end-user printing. Therefore, an end-user does not have to individually make driver or printer changes.

In some examples, the UI 104 is not accessible by the end-user without a security pin entry. For instance, a security pin may allow a dealer or administrator to adjust the depletion levels, but may prevent an end-user from changing the depletion levels.

Figure 3:
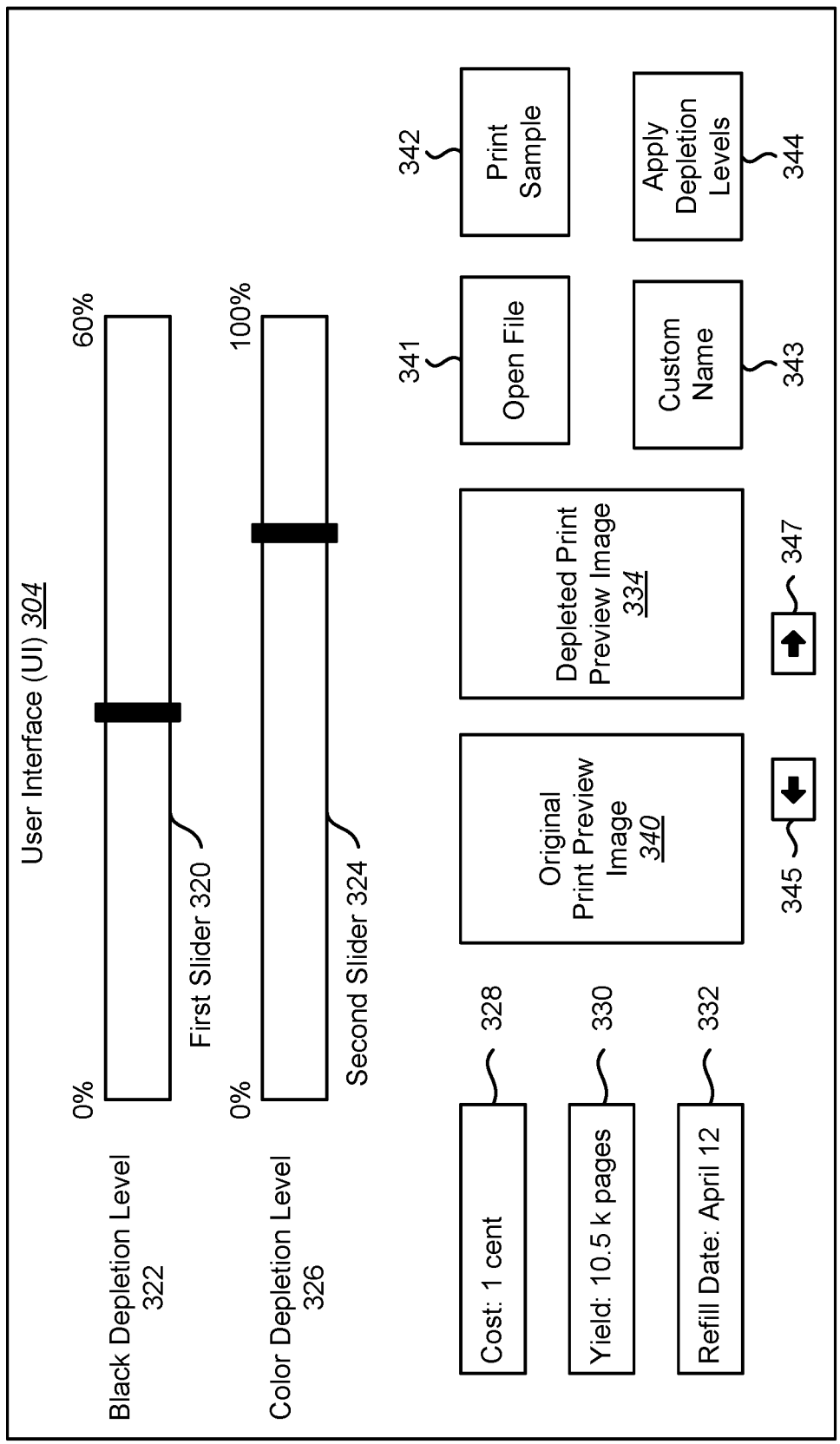
FIG. 3 is a graphical illustration of a UI to select depletion levels with multiple sliders.

FIG. 3 is a graphical illustration of a UI 304 to select depletion levels with multiple sliders. In this example, the UI 304 may include a first slider 320 to select a black depletion level 322. It should be noted that the black depletion level 322 in this example has a black depletion threshold of 60%.

A second slider 324 may be used to select a color depletion level 326 for multiple colors (e.g., CMY). In this case, the color depletion level 326 for the multiple colors are coupled (i.e., ganged) together in a single slider 324.

It should be noted that while sliders have been described, other types of control elements (physical or virtual) may be used to select the select depletion levels. Examples of different types of control elements are described in connection with FIG. 2.

The UI 304 may also display a predicted cost-per-page 328. The predicted cost-per-page 328 reflects the estimated cost to print a single page using the selected black depletion level 322 and color depletion level 326. In this example, the predicted cost-per-page 328 is represented as the monetary print cost in units of cents (e.g., 1 cent per page). The predicted cost-per-page 328 may be configured for different regions and different monetary denominations.

The UI 304 may also display a predicted page yield 330. The predicted page yield 330 may reflect an estimated number of pages that can be printed using with the selected black depletion level 322 and color depletion level 326. In this example, the predicted page yield 330 is represented as a total number of pages (e.g., 10.5 k pages) that may be printed using the selected black depletion level 322 and color depletion level 326.

The UI 304 may also display a predicted supply exhaustion date 332. The predicted supply exhaustion date 332 may reflect the estimated date at which a refill of a print supply (e.g., ink, toner, cartridge, etc.) occurs. In this example, the predicted supply exhaustion date 332 is represented as a certain calendar date (e.g., April 12). The predicted supply exhaustion date 332 may also be expressed as a number of days remaining before supply exhaustion.

It should be noted that the predicted cost-per-page 328, the predicted page yield 330 and the predicted supply exhaustion date 332 may be updated in real time. For example, as a user changes the black depletion level 322 and/or the color depletion level 326, the predicted cost-per-page 328, the predicted page yield 330 may change to reflect the selected depletion levels 322, 326. The predicted cost-per-page 328, the predicted page yield 330 and the predicted supply exhaustion date 332 may be determined from a history of printing and/or parameters (e.g., costs, supply and/or refill information) entered into the UI 304.

The UI 304 may also display print preview images. In this example, the UI 304 displays an original print preview image 340 and a depleted print preview image 334. The original print preview image 340 may represent an unmodified document. In other words, the original print preview image 340 may represent the document without applying the black depletion level 322 and/or color depletion level 326.

The depleted print preview image 334 may represent the black depletion level 322 and/or color depletion level 326 applied to the document. As the user changes the black depletion level 322 and/or the color depletion level 326, the depleted print preview image 334 may change to reflect the selected depletion levels 322, 326. The user may observe the differences between the original print preview image 340 and the depleted print preview image 334 to compare the before and after states. The user may zoom in on the original print preview image 340 and/or the depleted print preview image 334 for additional details. In this way, the user may optimize the print quality in relation to cost, yield and/or supply exhaustion date.

The UI 204 may include an "Open File" button 341 to load content. Additionally, the UI 104 may display a left arrow button 345 and a right arrow button 347 to advance through the content (e.g., a slide deck of a presentation program).

The UI 304 may also include a print sample button 342. Upon selecting the black depletion level 322 and/or the color depletion level 326, the user may print out a sample to observe the actual appearance of the printed document. In some examples, the user may also print out the original print preview image 340 from the UI 304 to observe changes in the printed document.

The UI 304 may also include an apply depletion levels button 344. The selected black depletion level 322 and the selected color depletion level 326 may be saved and applied for future use. Upon applying the depletion levels 322, 326, a customized print mode may be saved. In some examples, the UI 304 may include a custom name button 343 to name the new customized print mode that is saved. Alternatively, the UI 304 may include a text field in which the custom name for the new customized print mode.

Figure 4:
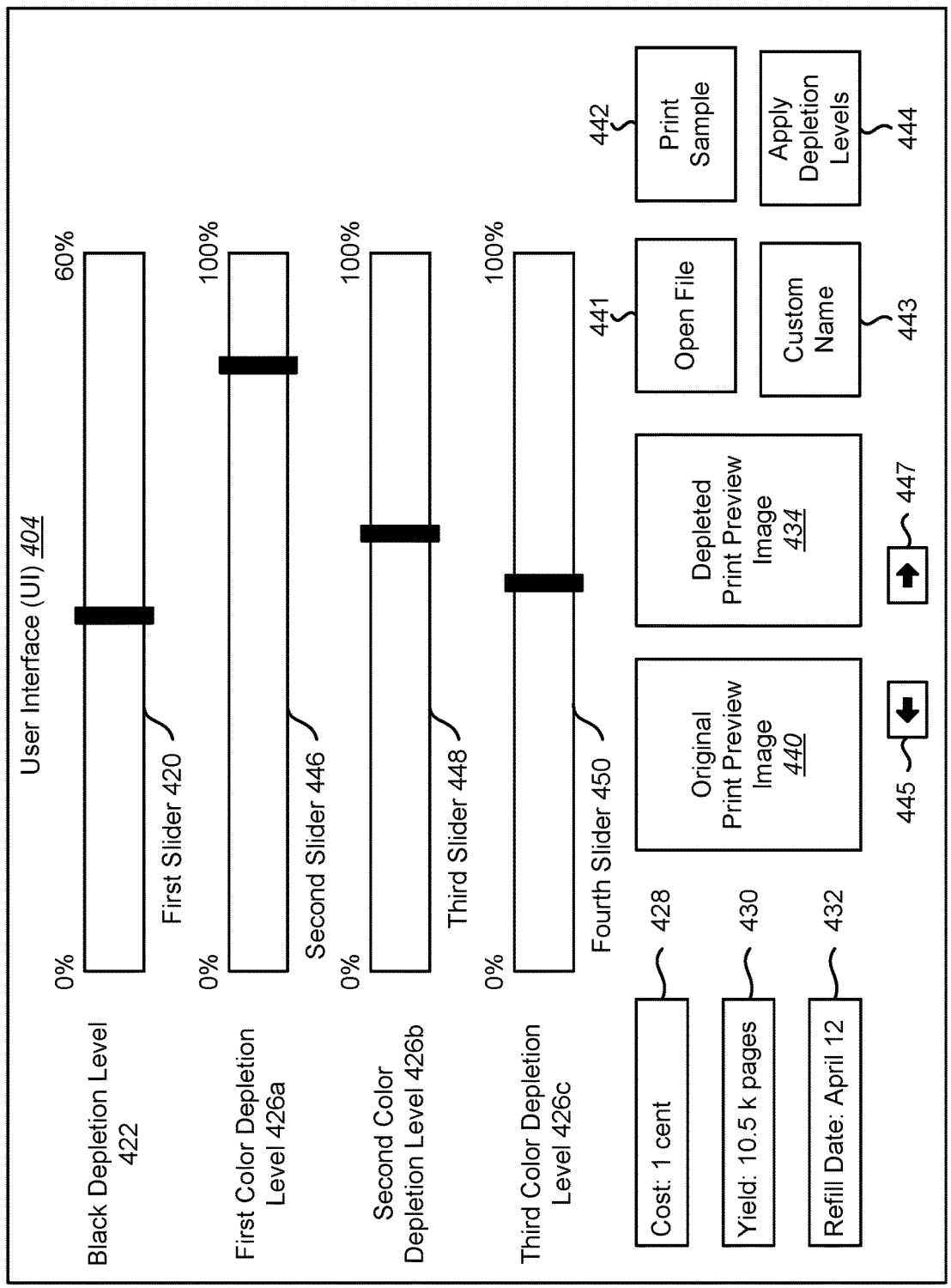
FIG. 4 is a graphical illustration of another UI to select depletion levels with multiple sliders.

FIG. 4 is a graphical illustration of another UI 404 to select depletion levels with multiple sliders. In this example, the UI 404 may include a first slider 420 to select a black depletion level 422.

The UI 404 also includes multiple sliders to individually control color depletion levels. A second slider 446 may be used to select a first color depletion level 426a for a first color (e.g., cyan). A third slider 448 may be used to select a second color depletion level 426b for a second color (e.g., magenta). A fourth slider 450 may be used to select a third color depletion level 426c for a third color (e.g., yellow).

The UI 404 may also include other control and/or information elements. For example, the UI 404 may include a predicted cost-per-page 428, a predicted page yield 430, a predicted supply exhaustion date 432, an original print preview image 440, a depleted print preview image 434, an open file button 441, a print sample button 442, a custom name button 443, an apply depletion levels button 444, and print preview selection arrows 445, 447 as described in connection with FIG. 3.

Figure 5:
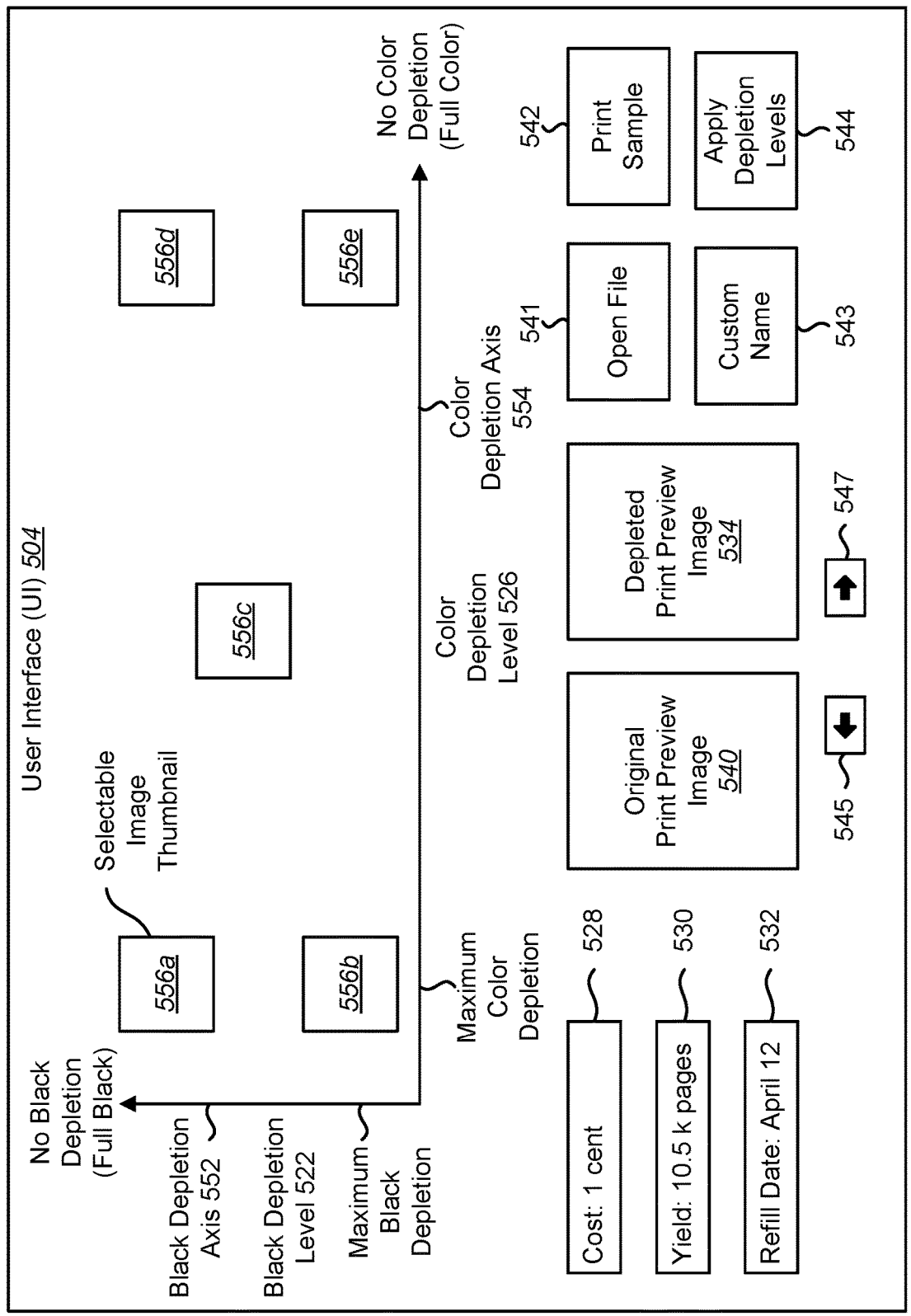
FIG. 5 is a graphical illustration of another UI to select depletion levels using selectable image thumbnails.

FIG. 5 is a graphical illustration of another UI 504 to select depletion levels using selectable image thumbnails 556. In this example, the UI 504 may include multiple selectable image thumbnails 556 showing different sample images corresponding to different black depletion levels 522 and color depletion levels 526.

In this example, the selectable image thumbnails 556 may be arranged in a grid of rows and columns. A black depletion axis 552 of the grid (e.g., the columns of the grid) may correspond to the black depletion level 522 and the color depletion axis 554 (e.g., the rows of the grid) may correspond to the color depletion level(s) 526. The black depletion axis 552 may span from a maximum black depletion level (e.g., a black depletion threshold) to no black depletion (e.g., full black). The color depletion axis 554 may span from a maximum color depletion level (e.g., a color depletion threshold) to no color depletion (e.g., full color).

In this example, five image thumbnails 556a-e are displayed in the UI 504. A first image thumbnail 556a corresponds to no black depletion (i.e., full black) and maximum color depletion. A second image thumbnail 556b corresponds to maximum black depletion and maximum color depletion. A third image thumbnail 556c corresponds to a medium black depletion and a medium color depletion. A fourth image thumbnail 556d corresponds to no black depletion and no color depletion (i.e., full color and full black). A fifth image thumbnail 556e corresponds to maximum black depletion and no color depletion.

A user may select an image thumbnail 556. Upon selecting the image thumbnail 556, the black depletion levels 522 and color depletion levels 526 associated with the image thumbnail 556 are selected.

The UI 504 may also include other control and/or information elements. For example, the UI 504 may include a predicted cost-per-page 528, a predicted page yield 530, a predicted supply exhaustion date 532, an original print preview image 540, a depleted print preview image 534, an open file button 541, a print sample button 542, a custom name button 543, an apply depletion levels button 544, and print preview selection arrows 545, 547 as described in connection with FIG. 3.

Figure 6:
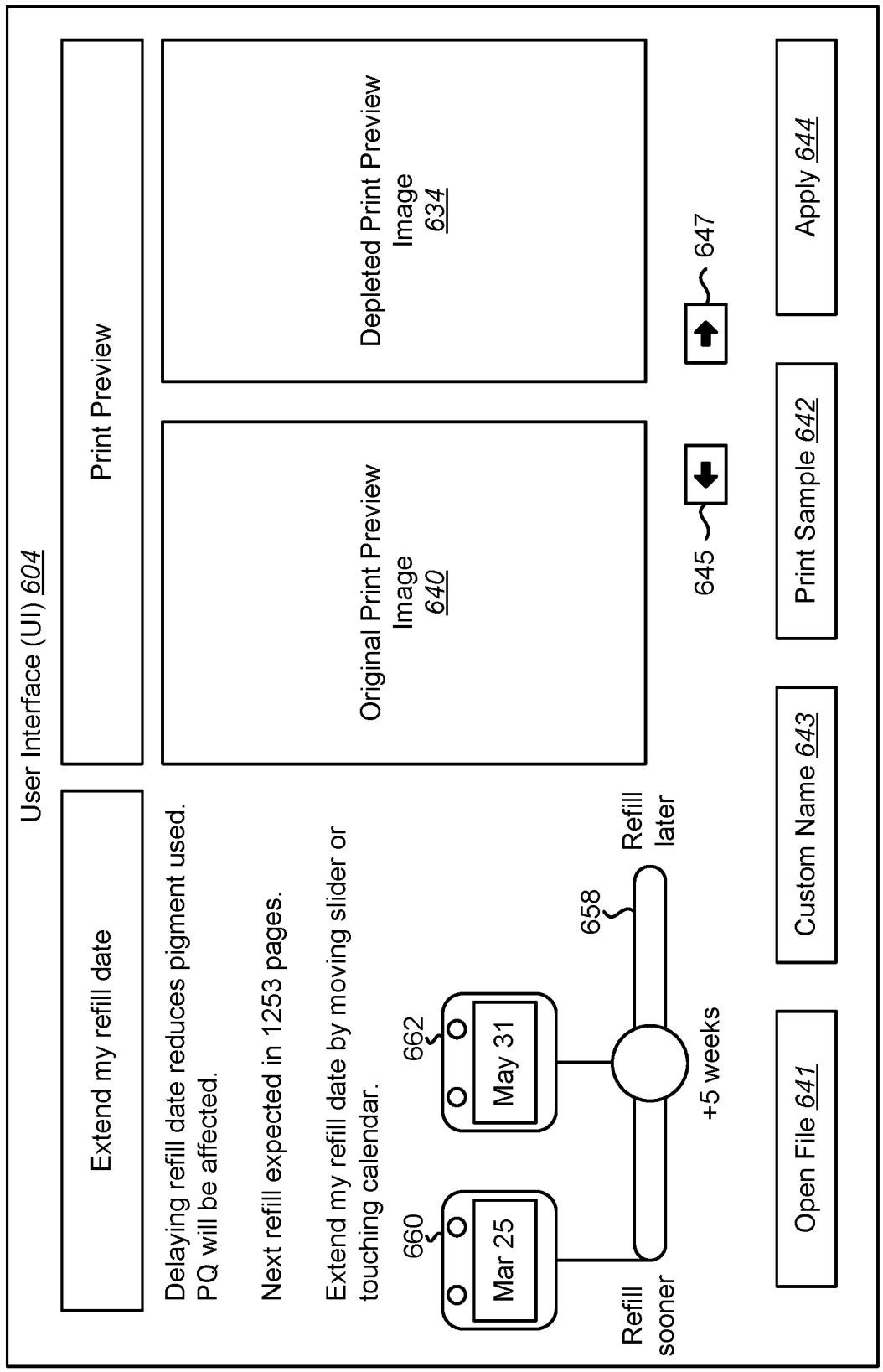
FIG. 6 is a graphical illustration of another UI to select depletion levels based on a supply refill date.

FIG. 6 is a graphical illustration of another UI 604 to select depletion levels based on a supply refill date. In this example, the UI 604 includes a slider 658 that a user may adjust to extend a predicted supply exhaustion date (i.e., refill date). The predicted supply exhaustion date may be the date that a printing supply (e.g., ink) may run out based on selected depletion levels.

The UI 604 may display a current supply exhaustion date 660 and a modified supply exhaustion date 662. The current supply exhaustion date 660 may reflect a predicted supply exhaustion date without applying any black or color depletion. The modified supply exhaustion date 662 may reflect a predicted supply exhaustion date after applying a selected black or color depletion level.

As a user adjusts the slider 658, black and/or color depletion levels may increase or decrease accordingly. This may extend (i.e., delay) the predicted supply exhaustion date at the expense of print quality (PQ). In an approach, both the black depletion level and color depletion level may be adjusted by the slider 658. The black and/or color depletion levels may be adjusted in a non-uniform fashion to preserve print quality even in highly depleted modes.

The UI 604 may display an original print preview image 640 and a depleted print preview image 634. The depleted print preview image 634 may change in response to changes in the slider 658 to reflect the selected depletion levels. The UI 604 may also include an open file button 641 and print preview selection arrows 445, 447 as described in connection with FIG. 3. The UI 604 may also include a print sample button 642, custom name button 643 and/or an apply depletion levels button 644 as described in connection with FIG. 3.

Figure 7:
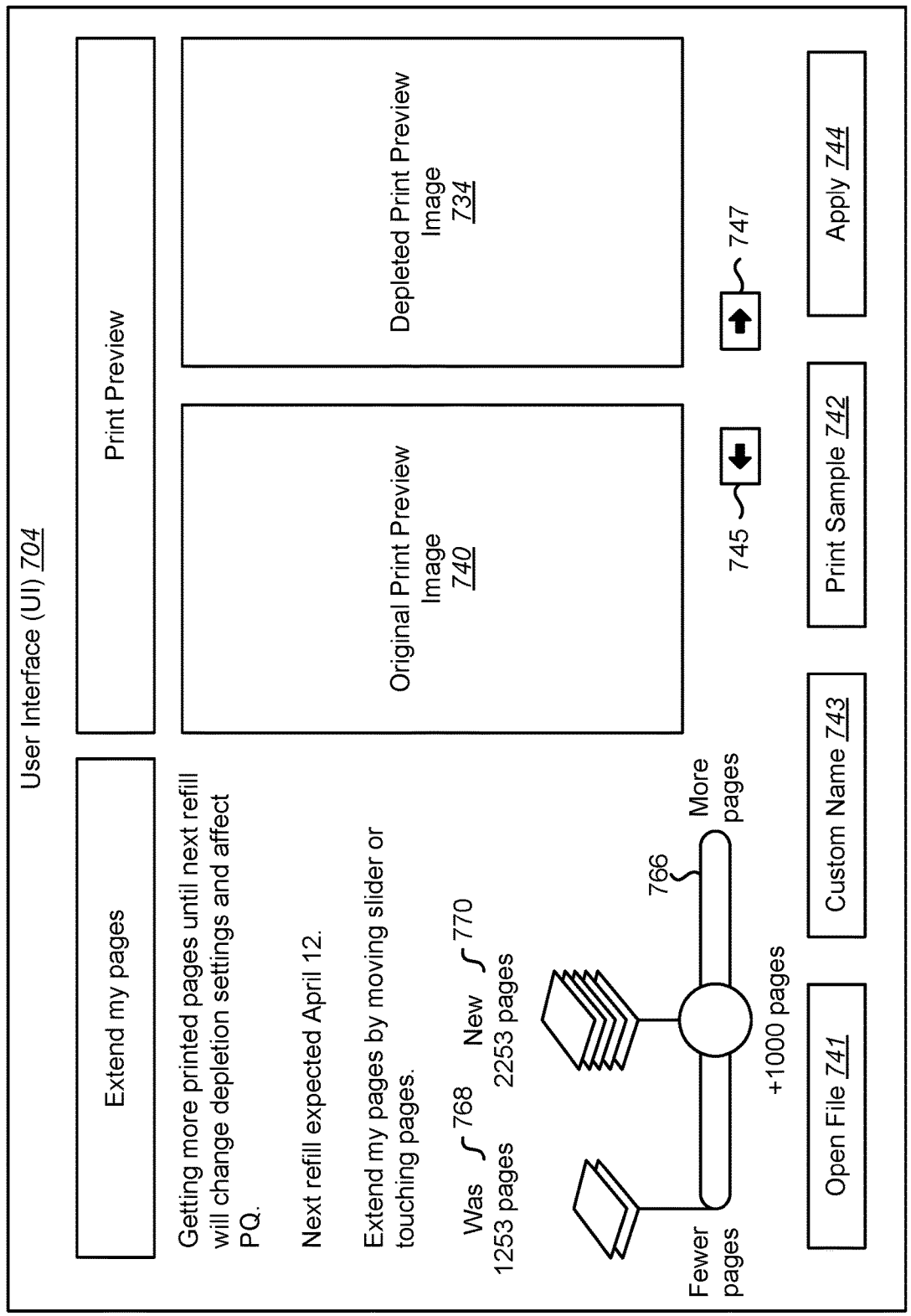
FIG. 7 is a graphical illustration of another UI to select depletion levels based on a predicted page yield.

FIG. 7 is a graphical illustration of another UI 704 to select depletion levels based on a predicted page yield. In this example, the UI 704 includes a slider 766 that a user may adjust to extend a predicted page yield. The predicted page yield may be an estimated number of pages that can be printed with the print substance (e.g., ink) using the selected depletion levels before a refill is expected.

The UI 704 may display a current page yield 768 and a modified page yield 770. The current page yield 768 may reflect an estimated number of printed pages without applying any black or color depletion. The modified page yield 770 may reflect an estimated number of printed pages after applying a selected black or color depletion.

As a user adjusts the slider 766, black and/or color depletion levels may increase or decrease accordingly. This may increase the predicted page yield at the expense of print quality (PQ). In an approach, both the black depletion level and color depletion level may be adjusted by the slider 766.

The UI 704 may display an original print preview image 740 and a depleted print preview image 734. The depleted print preview image 734 may change in response to changes in the slider 766 to reflect the selected depletion levels. The UI 604 may also include an open file button 641 and print preview selection arrows 445, 447 as described in connection with FIG. 3. The UI 604 may also include a print sample button 642, custom name button 643 and/or an apply depletion levels button 644 as described in connection with FIG. 3.

Figure 8:
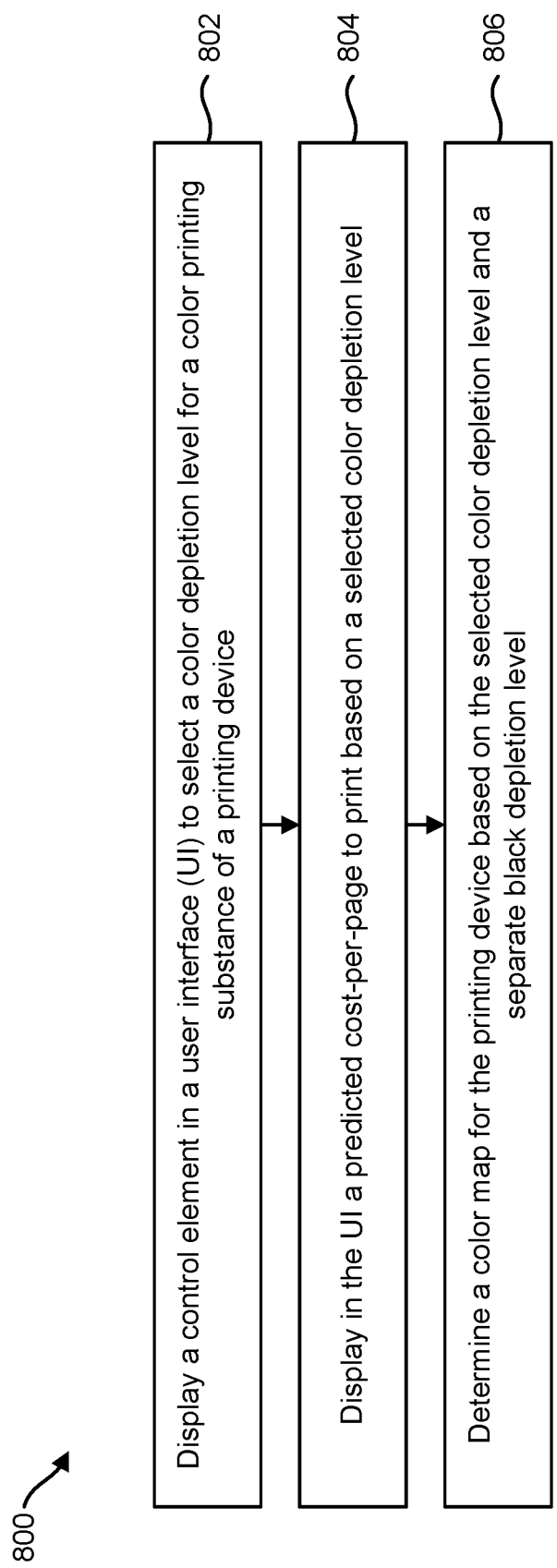
FIG. 8 is a flow diagram illustrating a method for depletion level selection.

FIG. 8 is a flow diagram illustrating a method 800 for depletion level selection. The method 800 may be implemented by a computing device 102. The computing device 102 may display 802 a control element 224 in a UI 104 to select a color printing substance of a printing device 114.

In an approach, the control element 224 may include a slider to select the color depletion level 226 for multiple colors. For example, the depletion level 226 of multiple colors (e.g., CMY) may be ganged together to the slider.

In another approach, the control element 224 may include multiple sliders to individually select color depletion levels 226 for multiple colors. This may be accomplished as described in connection with FIG. 4.

In yet another approach, the control element 224 may include a color depletion axis in a grid of selectable image thumbnails corresponding to the color depletion level 226. This may be accomplished as described in connection with FIG. 5.

The computing device 102 may display 804 in the UI 104 a predicted cost-per-page 228 to print based on a selected color depletion level 226. The computing device 102 may also display in the UI 104 a predicted page yield 230 based on the selected color depletion level 226. The computing device 102 may also display in the UI 104 a predicted supply exhaustion date 232 based on the selected color depletion level 226. The computing device 102 may additionally display in the UI 104 a print preview image 234 that reflects the selected color depletion level 226 in real time.

The computing device 102 may determine 806 a color map 119 for the printing device 114 based on the selected color depletion level 226 and a separate black depletion level 222. For example, the computing device 102 may determine 806 the color map 119 for the printing device 114 by interpolating from an existing color map or multiple color maps based on the selected color depletion level 226 and the separate black depletion level 222.

In an implementation, the separate black depletion level 222 may be determined based on an optimization to maintain luminous intensity for colors in a depletion mode. For example, a luminous intensity for source colors may be converted into a corresponding greyscale color space based on the selected color depletion level 226. The separate black depletion level 222 may be adjusted along with the color depletion level 226 to correspond to a luminous intensity that matches that of the greyscale color space.

In another implementation, the separate black depletion level 222 may be user-selectable. For example, the UI 204 may display a control element 220 for selecting the black depletion level 222.

The computing device 102 may associate the color map 119 with a specific user or application. For example, the selected color depletion level 226 and resulting color map 119 may be saved as a default printing mode for a user of the printing device 114 and/or an application (e.g., program) that prints to the printing device 114.

FIG. 9 is a flow diagram illustrating another method 900 for depletion level selection. The method 900 may be implemented by a computing device 102. The computing device 102 may display 902 a first control element 220 in a UI 104 to select a black depletion level 222 for a black printing substance of a printing device 114. The computing device 102 may also display 904 a second control element 224 in the UI 104 to select a color depletion level 226 for a color printing substance of the printing device 114.

In an approach, the first control element 220 may include a first slider to select the black depletion level 222 and the second control element 224 may include a second slider to select the color depletion level 226 for multiple colors. For example, the depletion level 226 of multiple colors (e.g., CMY) may be ganged together to the single second slider.

In another approach, the first control element 220 may include a first slider to select the black depletion level 222 and the second control element 224 may include multiple sliders to individually select color depletion levels 226 for multiple colors. This may be accomplished as described in connection with FIG. 4.

In yet another approach, the first control element 220 may include a black depletion axis in a grid of selectable image thumbnails corresponding to the black depletion level 222. The second control element 224 may include a color depletion axis in the grid of selectable image thumbnails corresponding to the color depletion level 226. This may be accomplished as described in connection with FIG. 5.

The computing device 102 may display 906 in the UI 104 a predicted cost-per-page 228 to print based on a selected black depletion level 222 and a selected color depletion level 226. The computing device 102 may also display in the UI 104 a predicted page yield 230 based on the selected black depletion level 222 and the selected color depletion level 226. The computing device 102 may also display in the UI 104 a predicted supply exhaustion date 232 based on the selected black depletion level 222 and the selected color depletion level 226. The computing device 102 may additionally display in the UI 104 a print preview image 234 that reflects the selected black depletion level 222 or the selected color depletion level 226 in real time.

The computing device 102 may determine 908 a color map 119 for the printing device 114 based on the selected black depletion level 222 and the selected color depletion level 226. For example, the computing device 102 may determine 908 the color map 119 for the printing device 114 by interpolating from an existing color map or multiple color maps based on the selected black depletion level 222 and the selected color depletion level 226.

The computing device 102 may associate the selected black depletion level 222 and the selected color depletion level 226 with a specific user or application. For example, the selected black depletion level 222 and the selected color depletion level 226 may be saved as a default printing mode for a user of the printing device 114 and/or an application (e.g., program) that prints to the printing device 114.

The invention claimed is:

1. A method, comprising:
    displaying a control element in a user interface (UI) to select a color depletion level for a color printing substance of a printing device;
    displaying in the UI a predicted cost-per-page to print based on a selected color depletion level; and
    determining a color map for the printing device based on the selected color depletion level and a separate black depletion level.

2. The method of claim 1, wherein the separate black depletion level is determined based on an optimization to maintain luminous intensity for colors in a depletion mode.

3. The method of claim 1, wherein the separate black depletion level is user-selectable.

4. The method of claim 1, comprising:
    displaying in the UI a print preview image that reflects the selected color depletion level in real time.

5. The method of claim 1, comprising:
    displaying in the UI a predicted page yield based on the selected color depletion level.

6. The method of claim 1, comprising:
    displaying in the UI a predicted supply exhaustion date based on the selected color depletion level.

7. The method of claim 1, wherein the control element comprises a slider to select the color depletion level for multiple colors.

8. The method of claim 1, wherein the control element comprises multiple sliders to individually select color depletion levels for multiple colors.

9. The method of claim 1, wherein the control element comprises a color depletion axis in a grid of selectable image thumbnails corresponding to the color depletion level.

10. The method of claim 1, wherein determining the color map for the printing device comprises interpolating from an existing color map based on the selected color depletion level.

11. The method of claim 1, wherein the color map is associated with a specific user or application.

12. A computing device, comprising:
    a memory;
    a processor coupled to the memory, wherein the processor is to:
        display a control element in a user interface (UI) to select a color depletion level for a color printing substance of a printing device;
        display in the UI a predicted cost-per-page to print based on a selected color depletion level; and
        determine a color map for the printing device based on the selected color depletion level and a separate black depletion level.

13. The computing device of claim 12, wherein the processor is to:
    display in the UI a predicted page yield based on the selected color depletion level.

14. The computing device of claim 12, wherein the processor is to:
    display in the UI a predicted supply exhaustion date based on the selected color depletion level.

15. A non-transitory machine-readable storage medium encoded with instructions executable by a processor, the machine-readable storage medium comprising:
    instructions to display a slider in a user interface (UI) to select a color depletion level for a color printing substance of a printing device;
    instructions to display in the UI a predicted cost-per-page to print based on a selected color depletion level; and
    instructions to determine a color map for the printing device by interpolating from an existing color map based on the selected color depletion level and a separate black depletion level.

* * * * *